(12) United States Patent
Kiyosawa

(10) Patent No.: US 10,415,109 B2
(45) Date of Patent: Sep. 17, 2019

(54) WORKPIECE FOR INDUCTION HARDENING

(71) Applicant: NETUREN CO., LTD., Tokyo (JP)

(72) Inventor: Yutaka Kiyosawa, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 323 days.

(21) Appl. No.: 15/301,050

(22) PCT Filed: Mar. 31, 2015

(86) PCT No.: PCT/JP2015/060238
§ 371 (c)(1),
(2) Date: Sep. 30, 2016

(87) PCT Pub. No.: WO2015/152285
PCT Pub. Date: Oct. 8, 2015

(65) Prior Publication Data
US 2017/0029910 A1    Feb. 2, 2017

(30) Foreign Application Priority Data

Apr. 1, 2014   (JP) .................................. 2014-075704

(51) Int. Cl.
*C21D 1/42*    (2006.01)
*C21D 9/00*    (2006.01)
*C21D 1/10*    (2006.01)

(52) U.S. Cl.
CPC ............. *C21D 9/0068* (2013.01); *C21D 1/10* (2013.01); *C21D 1/42* (2013.01); *C21D 9/00* (2013.01); *Y02P 10/253* (2015.11)

(58) Field of Classification Search
CPC ... C21D 1/10; C21D 1/42; C21D 9/00; C21D 9/0068; Y02P 10/25
See application file for complete search history.

(56) References Cited

U.S. PATENT DOCUMENTS

2012/0222779 A1* 9/2012 Itagaki .................... F16D 3/202
148/400
2014/0144904 A1* 5/2014 Nakatsu ................. H05B 6/101
219/650

FOREIGN PATENT DOCUMENTS

| JP | 11-219779 | 8/1999 |
| JP | 2000-313916 | 11/2000 |
| JP | 2003-160812 | 6/2003 |
| JP | 2012-251185 | 12/2012 |

OTHER PUBLICATIONS

International Search Report dated Jul. 7, 2015 in International Application No. PCT/JP2015/060238.
Extended European Search Report dated Jul. 27, 2017 in corresponding European patent application No. 15772387.5.

* cited by examiner

*Primary Examiner* — Veronica F Faison
(74) *Attorney, Agent, or Firm* — Wenderoth, Lind & Ponack, L.L.P.

(57) ABSTRACT

A workpiece for an induction hardening is provided. The workpiece has a first inclined surface, a second inclined surface, and a connecting surface connecting the first inclined surface and the second inclined surface on a side toward which the first inclined surface and the second inclined surface approach each other. The connecting surface has a recessed portion. A hardened layer formed at the first inclined surface and another hardened layer formed at the second inclined surface do not overlap each other at the recessed portion.

10 Claims, 3 Drawing Sheets

WORKPIECE FOR INDUCTION HARDENING

TECHNICAL FIELD

The present invention relates to a workpiece for induction hardening having a plurality of inclined surfaces to be heated sequentially.

BACKGROUND

When performing an induction hardening treatment on a plurality of inclined surfaces of a workpiece by induction heating or the like, it is sometimes difficult to simultaneously perform the hardening treatment on all of the inclined surface. For example, when performing the hardening treatment on two inclined surfaces 12a, 12b of a workpiece configured in a tapered manner as shown in FIG. 4, the inclined surface 12a on one side of the workpiece is firstly heated by an induction heating coil 10 and the heated inclined surface 12a is then quenched. Next, the workpiece is turned upside down, and the inclined surface 12b tin the opposite side is induction-heated in a similar manner (see Patent Document 1).

PRIOR ART DOCUMENT

Patent Document
    Patent Document 1: JP2012-251185A

However, as shown in FIG. 5, there is a case where a distance A between the inclined surfaces 12a, 12b on tip sides of the inclined surfaces 12a, 12b and a depth B of hardened layers 14a, 14b formed by heating the inclined surfaces 12a, 12b are deep, in such a case, when after the inclined surface 12a has been heated, the workpiece is reversed and the other inclined surface 12b is heated, thermal expansion occurs at the hardened layer 14a that has been formed before the workpiece is reversed, which makes a connecting surface 13 connecting the inclined surfaces 12a, 12b at their tip sides easy to crack. In another instance, the hardened layers 14a, 14b may overlap at the connecting surface 13, in which case the hardened layers are heated unevenly thereby adversely affecting the quality of the workpiece after the heat treatment.

SUMMARY OF INVENTION

Problem to be Solved by Invention

It is an object of the present invention to provide a workpiece for induction hardening, in which, even when a second inclined surface is heated after a first inclined surface has been heated, a thermal effect on the firstly formed hardened layer is suppressed, so that a tip end surface is less likely to crack and the hardened layer are prevented from overlapping each other.

Means for Solving the Problem

According to an aspect of the invention, a workpiece for an induction hardening is provided. The workpiece includes a first inclined surface, a second inclined surface, and a connecting surface connecting the first inclined surface and the second inclined surface on a side toward which the first inclined surface and the second inclined surface approach each other, and this connecting surface has a recessed portion.

The workpiece is configured such that, when a hardened layer is formed at the first inclined surface and another hardened layer is formed at the second inclined surface, the hardened layers do not overlap each other at the recessed portion.

Advantageous Effect of Invention

According to an aspect of the invention, it is possible to obtain a workpiece in which the connecting surface at a tip end portion is less likely to crack even when the second inclined surface is heated in a subsequent step after the first inclined surface has been heated, so that it is produced with high quality and a good yield rate.

DESCRIPTION OF EMBODIMENT

Hereinafter, embodiments of the present invention will be described in detail with reference to the drawings.

Figure 1:
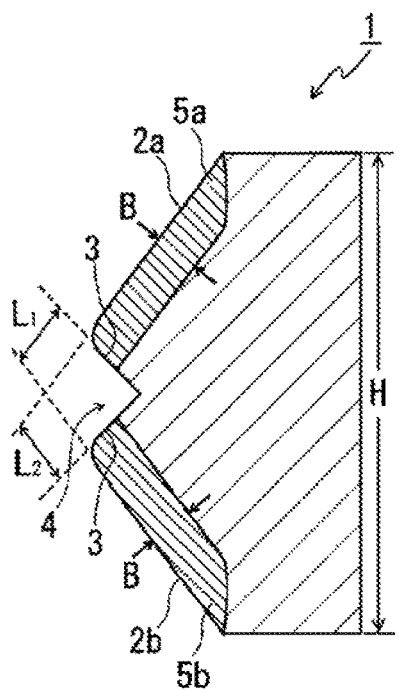
FIG. 1 is a schematic sectional view of a workpiece according to an embodiment of the present invention.

FIG. 1 illustrates a workpiece 1 for an induction hardening according to one embodiment. The workpiece 1 has a first inclined surface 2a and a second inclined surface 2b. The inclined surfaces 2a, 2b are configured in a tapered manner. On a side toward which the inclined surfaces 2a, 2b approach each other, a connecting surface 3 connecting the inclined surfaces 2a, 2b is formed. That is, the inclined surfaces 2a, 2b are connected by the connecting surface 3 on the side toward which the inclined surfaces 2a, 2b approach each other. The connecting surface 3 is configured, not as a single flat surface, but to have a recessed portion 4 recessed toward an inside of the workpiece 1. The recessed portion 4 is configured as a linear indentation toward the inside of the workpiece 1 at a give angle and has a triangular cross sectional shape.

When performing an induction hardening on the inclined surfaces 2a, 2b of the workpiece 1, the first inclined surface 2a is firstly heated by an induction heating coil and quenched, and thereafter, the workpiece 1 is reversed, and the second inclined surface 2b is heated and quenched. In this manner, a hardened layer 5a is formed inwardly on a side of the first inclined surface 2a to have a given thickness, and a hardened layer 5b is subsequently formed inwardly on a side of the second inclined surface 2b to have a given thickness. The connecting surface 3 connecting the inclined surfaces 2a, 2b at their tip end sides is notched by a certain amount to form a recessed portion 4. Accordingly, when heating the first inclined surface 2a to form the hardened layer 5a, the second inclined surface 2b is not thermally affected. Also when heating the second inclined surface 2b to form the hardened layer 5b, the first inclined surface 2a is not thermally affected, and the hardened layer 5a is therefore heated twice.

When hardening the second inclined surface 2b after hardening the first inclined surface 2a, to perform the heating treatment sequentially, the position of the induction hardening coil may be changed while holding the workpiece in place without reversing it.

Figure 2:
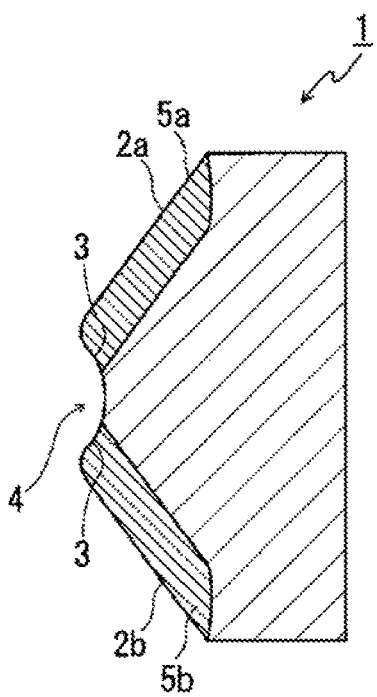
FIG. 2 is a schematic sectional view of a modified example of the workpiece.
Figure 3:
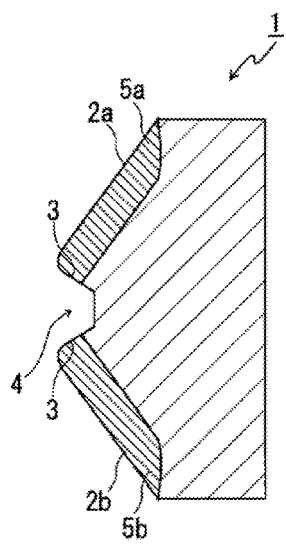
FIG. 3 is a schematic sectional view of another modified example of the workpiece.
Figure 4:
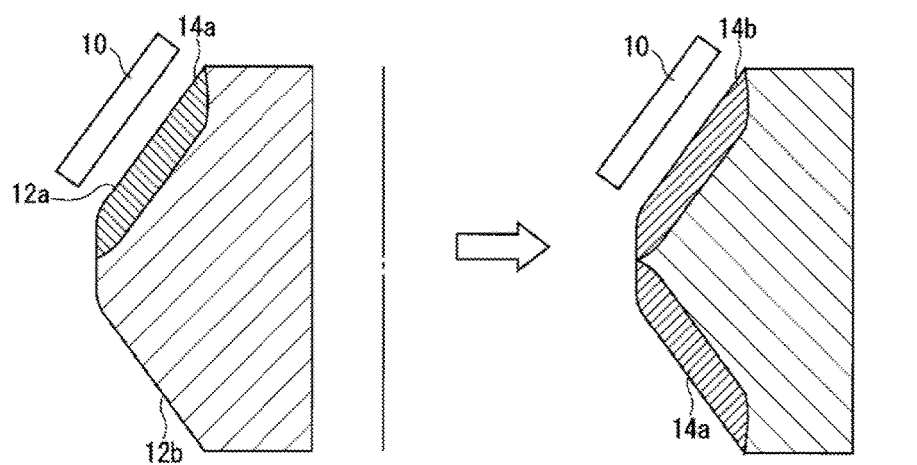
FIG. 4 is a diagram illustrating an induction heat treatment method using a conventional workpiece.

Instead of being formed as an indentation having a triangular cross sectional shape as shown in FIG. 1, the recessed portion 4 may be formed as a circular arc (FIG. 2) or trapezoidal (FIG. 3) indentation as shown in the modified examples of FIGS. 2 and 3. In short, the connecting surface 3 at the tip end portion is cut out with an area by which, when forming the hardened layer 5b by quenching the second inclined surface 2b in a step subsequent to forming the hardened layer 5a by quenching the first inclined surface 2a, the heating for the quenching is prevented from being transferred to the hardened layer 5a that has been formed in the first step. To the extent that this is met, the indentation may be formed in any shape and at any region.

The workpiece 1 extends in one direction with a substantially fixed shape. Here, the one direction includes a straight line, a wave line, a curved line, a ring shape or an annular shape.

An example in which the workpiece 1 has an annular shape will be described below in detail.

Figure 5:
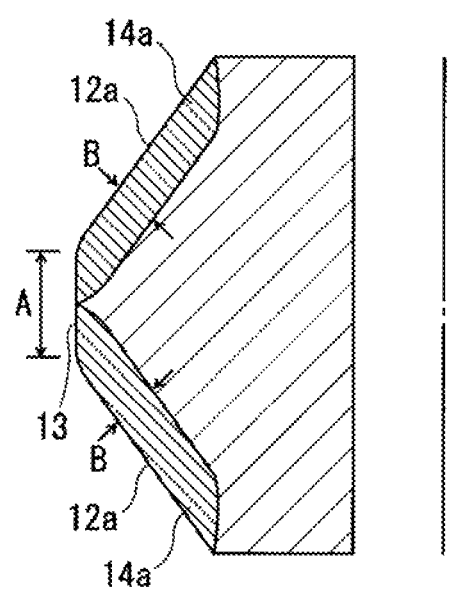
FIG. 5 is a schematic sectional view of the workpiece obtained by the method illustrated in FIG. 4.

In this embodiment, a length (L1+L2) of the connecting surface 3 connecting the inclined surfaces 2a, 2b is longer than the length A of the connecting surface 13 of the conventional example of FIG. 5. Therefore, when heating the second inclined surface 2b of the reversed workpiece 1 by the induction hearing coil 10 after the first inclined surface 2a has been heated by the induction heating coil 10 and quenched to form the hardened layer 5a, it makes the heat difficult to be transferred to the hardened layer 5a that has already been formed at the first inclined surface 2a. This makes it possible to suppress thermal expansion during the second heat treatment so that heating cracks can be prevented.

By performing induction heat treatment is performed on the inclined surfaces 2a, 2b of the workpiece 1, it is possible to obtain the workpiece 1 having the hardened layers 5a, 5b at the inclined surfaces 2a, 2b. That is, it is possible to obtain the workpiece 1 having the inclined surfaces 2a, 2b, the hardened layers 5a, 5b formed at the inclined surfaces 2a, 2b, and the connecting surface 3 connecting the inclined surfaces 2a, 2b on the side toward which the inclined surfaces 2a, 2b approach each other, in which the connecting surface 3 has the recessed portion 4, and the hardened layers 5a, 5b do not overlap each other at the recessed portion 4.

To obtain a workpiece with deeper depths B of the hardened layers 5a, 5b at the inclined surfaces 2a, 2b, the shape of the recessed portion 4 may be changed such that the length (L1+L2) of the connecting surface 3 is changed, thereby preventing the hardened layers 5a, 5b form being formed in an overlapping manner at the recessed portion 4.

The present application is based on Japanese Patent Application No. 2014-075704 filed on Apr. 1, 2014, the content of which is incorporated herein by reference.

DESCRIPTION OF REFERENCE SIGNS 1 workpiece for induction hardening
2a, 2b inclined surface
3 connecting surface
4 recessed portion
5a, 2b hardened layer
10 induction heating coil
12a, 12b inclined surface
13 connecting surface
14a, 14b hardened layer

The invention claimed is:

1. A workpiece for an induction hardening, the workpiece comprising a first inclined surface, a second inclined surface, and a connecting surface connecting the first inclined surface and the second inclined surface on a side toward which the first inclined surface and the second inclined surface approach each other, wherein the connecting surface comprises a recessed portion.

2. The workpiece according to claim 1, wherein the first inclined surface and the second inclined surface are arranged such that the second inclined surface is heat-treated after heat-treating the first inclined surface.

3. The workpiece according to claim 1, wherein the recessed portion has a circular arc cross sectional shape.

4. The workpiece according to claim 1, wherein the recessed portion has a triangular cross sectional shape.

5. The workpiece according to claim 1, wherein the workpiece has an annular shape.

6. The workpiece according to claim 1, further comprising a hardened layer formed at the first inclined surface and another hardened layer formed at the second inclined surface,
    wherein the hardened layers do not overlap each other at the recessed portion.

7. The workpiece according to claim 1, wherein the first inclined surface and the second inclined surface are configured in a tapered manner.

8. The workpiece according to claim 1, wherein the recessed portion is recessed toward an inside of the workpiece.

9. The workpiece according to claim 1, wherein the first inclined surface and the second inclined surface are separated from each other.

10. The workpiece according to claim 1, further comprising a hardened layer formed at the first inclined surface and another hardened layer formed at the second inclined surface,
    wherein a depth of the recessed portion is deeper than a depth of each of the hardened layers.

* * * * *